United States Patent
Carao et al.

(10) Patent No.: US 12,339,987 B2
(45) Date of Patent: Jun. 24, 2025

(54) AUTOMATED MACHINE LEARNING ACCESS RIGHTS ENGINE

(71) Applicant: Wells Fargo Bank, N.A., San Francisco, CA (US)

(72) Inventors: Alejandro J. Carao, Atlanta, GA (US); Robert William Childress, Peoria, AZ (US); Donnell Douglas, Charlotte, NC (US); Jaisimha L. Gyanmote, Buffalo Grove, IL (US); Jonathan Wayne Ingram, Covington, WA (US); Gokarna KC, Concord, NC (US); Naresh Kumar Koppuravuri, Hyderabad (IN); Suki Ramasamy, Chennai (IN); Tara R. Ross, Norwalk, IA (US); Vijay Talupula, YSR Kadapa District (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 252 days.

(21) Appl. No.: 18/307,635

(22) Filed: Apr. 26, 2023

(65) Prior Publication Data

US 2024/0362352 A1 Oct. 31, 2024

(51) Int. Cl.
*H04L 29/06* (2006.01)
*G06F 21/62* (2013.01)

(52) U.S. Cl.
CPC ................ *G06F 21/6218* (2013.01)

(58) Field of Classification Search
CPC .................................... G06F 21/6218
See application file for complete search history.

(56) References Cited

U.S. PATENT DOCUMENTS 10,482,268 B1   11/2019   Osborne et al.
11,010,488 B2    5/2021   Roden et al.
(Continued)

FOREIGN PATENT DOCUMENTS

KR    20220046870    4/2022
WO    2022112346     6/2022

OTHER PUBLICATIONS

"Overview of Role Recommendations", [Online]. Retrieved from the Internet: https: cloud.google.com policy-intelligence docs role-recommendations-overview, 20 pgs.
(Continued)

*Primary Examiner* — Wasika Nipa
(74) *Attorney, Agent, or Firm* — SCHWEGMAN LUNDBERG & WOESSNER, P.A.

(57) ABSTRACT

A method may include accessing digital characteristics associated with a user identifier, the digital characteristics including a task identifier assigned to the user identifier; encoding the digital characteristics into components of an input vector, the components of the input vector corresponding to inputs of a machine learning model; inputting the input vector into the machine learning model; executing the machine learning model; subsequent to the executing, accessing an output of the machine learning model, the output corresponding to a cluster identifier associated with a plurality of user identifiers with similar digital characteristics; and automatically transmitting a request to change a resource access right for the user identifier based on access rights associated with the cluster identifier.

18 Claims, 6 Drawing Sheets

(56) References Cited

U.S. PATENT DOCUMENTS

| | | |
|---|---|---|
| 11,115,421 B2 | 9/2021 | Nevatia et al. |
| 11,120,150 B2 | 9/2021 | Ravizza et al. |
| 11,210,418 B2 | 12/2021 | Stockert et al. |
| 11,316,864 B2 | 4/2022 | Asher et al. |
| 11,394,719 B2 | 7/2022 | Vegulla et al. |
| 11,457,015 B2 | 9/2022 | Carnahan et al. |
| 2020/0137150 A1* | 4/2020 | Chatley ................ G06F 3/0647 |
| 2020/0287904 A1* | 9/2020 | Asher ................... G06N 20/00 |
| 2020/0358784 A1 | 11/2020 | Khaund |
| 2021/0027181 A1 | 1/2021 | Roden et al. |
| 2021/0160244 A1* | 5/2021 | Carnahan .............. H04L 63/205 |
| 2021/0216893 A1 | 7/2021 | Roden et al. |
| 2021/0303360 A1 | 9/2021 | Rishabh et al. |
| 2021/0383008 A1 | 12/2021 | Manasse et al. |
| 2022/0255796 A1* | 8/2022 | Smith ................ H04L 67/1046 |

OTHER PUBLICATIONS

Frehn, Jacob, "Leveraging Machine Learning for Behavior Based Access Control", [Online]. Retrieved from the Internet: https: www.portnox.com blog network-access-control leveraging-machine-learning-for-bbac , (Jun. 14, 2022), 3 pgs.

Jones, Isa, "How Machine Learning Is Changing Access Monitoring", [Online]. Retrieved from the Internet: https: www.healthcareinfosecurity.com blogs how-machine-learning-changing-access-monitoring-p-3243?highlight=true, (Jul. 5, 2022), 3 pgs.

McDougald, Damon, "Rbac, you're about to get even better", [Online]. Retrieved from the Internet: https: www.accenture.com us-en blogs security role-based-access-control, (Nov. 4, 2021), 2 pgs.

Thiago, Ferraz, "AI and Machine Learning Applied to Identity and Access Management", [Online]. Retrieved from the Internet: https: www.linkedin.com pulse ai-machine-learning-aplicados-gest%C3%A30-de-identidades-e-thiago-ferraz , (Apr. 28, 2022), 8 pgs.

* cited by examiner

AUTOMATED MACHINE LEARNING ACCESS RIGHTS ENGINE

BACKGROUND

In an organization, a user may be assigned various tasks. Each of the tasks may require that a user access numerous resources. A resource may be a file, an application, a database, physical access to a building etc. Generally, a user may request access to a needed resource by filling out a form and obtaining the necessary approval. If approval is granted, access rights with respect to the resource may be modified to permit access to the requesting user.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawing.

DETAILED DESCRIPTION

Figure 1:
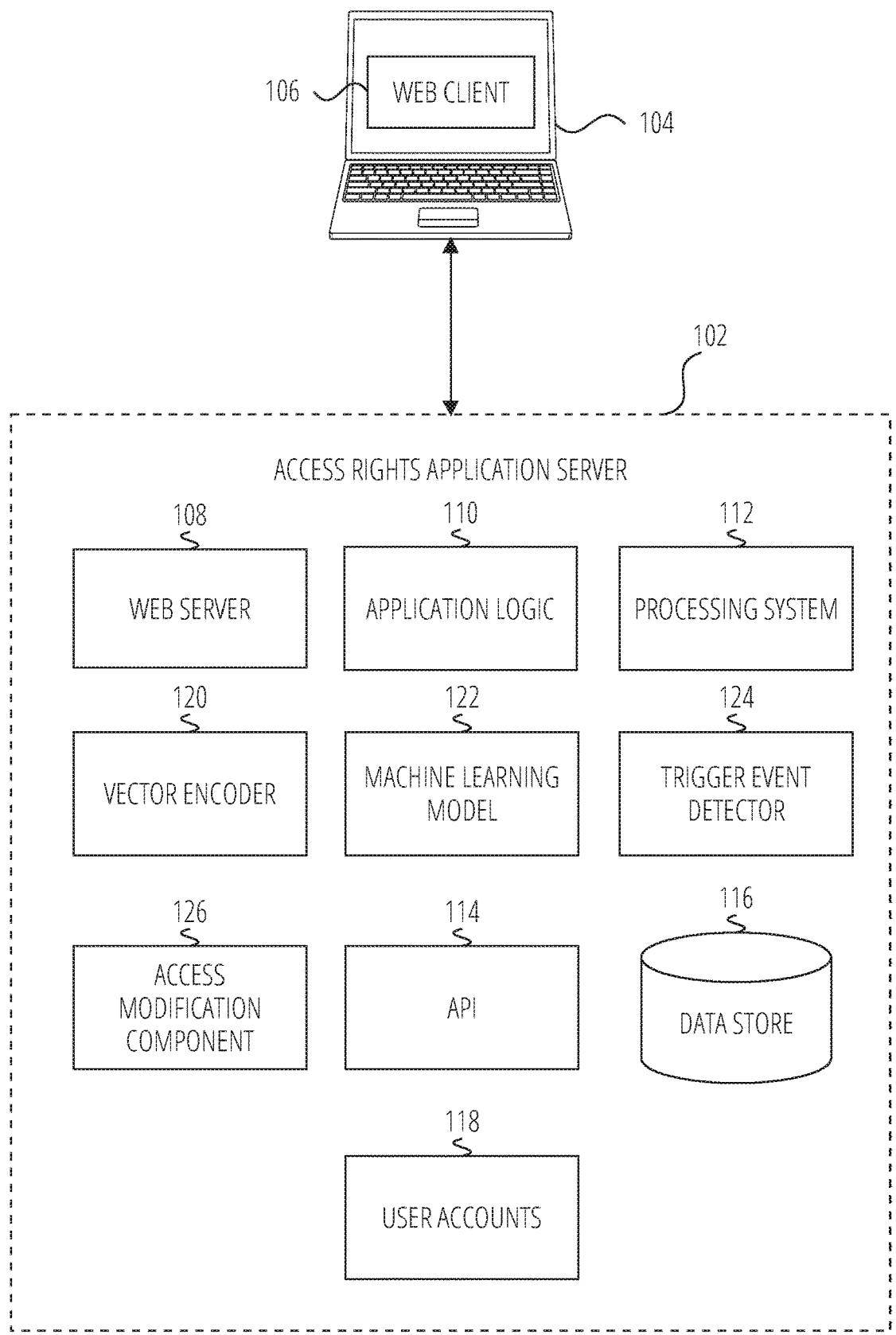
FIG. 1 is an illustration of elements of an access rights application server, according to various examples.

In the following description, for purposes of explanation, numerous specific details are set forth in order to provide a thorough understanding of some example embodiments. It will be evident, however, to one skilled in the art that the present invention may be practiced without these specific details.

Throughout this disclosure, electronic actions may be performed by components in response to different variable values (e.g., thresholds, user preferences, etc.). As a matter of convenience, this disclosure does not always detail where the variables are stored or how they are retrieved. In such instances, it may be assumed that the variables are stored on a storage device (e.g., Random Access Memory (RAM), cache, hard drive) accessible by the component via an Application Programming Interface (API) or other program communication method. Similarly, the variables may be assumed to have default values should a specific value not be described. User interfaces may be provided for an end-user or administrator to edit the variable values in some instances.

Managing access rights to enterprise resources (files, systems, website pages) has several challenges. Often the change in access rights requires requesting access—in some cases multiple requests—and waiting for a response. One challenge with a reactive approach such as this is that many times a user does not know they need access to a resource. For example, they may believe they already have access to it, or are not aware that a project they are working requires access to the resource. Furthermore, it is generally not only a single resource a user needs authorization for but may be several. Thus, the user will need to send multiple requests—one for each resource. In time critical situations—such as fixing security problems—requesting access may lead to loss of company data or services being down for a longer period than necessary.

Another problem with users needing to request access is that it may result in incorrect or incomplete access rights. For example, in systems that rely on human request and approval there is the possibility that approval is given where it should not be. Conversely, access rights may be denied when they should be granted. An additional problem may occur when access should be revoked but has not been. For example, if a user completes a task or has left a company, they may no longer requires access to a resource—creating a possible security risk.

Accordingly, an automated proactive system is described herein that alleviates the problems detailed above. For example, in order to determine ahead of time what resources may need for a project, a machine learning model is described that matches a user to a group of similar users. The system may then query the access rights for the group to identify their used resources and automatically request access to the used resources. In some examples, a response to a request for access may be denied, which in turn may update the machine learning model to be more accurate in the future.

FIG. 1 is an illustration of elements of an access rights application server, according to various examples. The illustration includes an access rights application server 102, a client device 104, a web client 106, a web server 108, an application logic 110, a processing system 112, an API 114, a data store 116, a user accounts 118, a vector encoder 120, a machine learning model 122, a trigger event detector 124, and an access modification component 126.

Access rights application server 102 is illustrated as set of separate elements (e.g., vector encoder 120, machine learning model 122, trigger event detector 124, access modification component 126, etc.). However, the functionality of multiple, individual elements may be performed by a single element. An element may represent computer program code that is executable by processing system 112. The program code may be stored on a storage device (e.g., data store 116) and loaded into a memory of the processing system 112 for execution. Portions of the program code may be executed in a parallel across multiple processing units (e.g., a core of a general-purpose computer processor, a graphical processing unit, an application specific integrated circuit, etc.) of processing system 112. Execution of the code may be performed on a single device or distributed across multiple devices. In some examples, the program code may be executed on a cloud platform (e.g., MICROSOFT AZURE® and AMAZON EC2®) using shared computing infrastructure.

User accounts 118 may include user profiles on users of access rights application server 102. A user profile may include credential information such as a username and hash of a password associated with an enterprise. A user account may store digital characteristics of the user with respect to the user's work with the enterprise. For example, a user profile may include a role of the user (per project in some examples), a location (if the user gives access approval), a list of distribution lists (e.g., email lists) the user is a member of, the departments the user is a member of, currently assigned projects, employment status, etc. The user profile may also identify a list of resource access rights that the user has. A resource may be, but is not limited to, a file, a physical location (e.g., building or room access), a software application—installed locally or network-accessible, a database, or a website page (e.g., a SharePoint page).

Instead of, in addition to, being stored in the user profile, resource access rights may be stored on disparate systems. For example, there may be a server (not shown) that manages physical access rights. Accordingly, on the server there may be an access control list (ACL) that includes identifiers for physical locations and the user identifiers of authorized users. Similarly, there may be a file management server that maintains ACLs for files used by the enterprise.

Client device 104 may be a computing device which may be, but is not limited to, a smartphone, tablet, laptop, multi-processor system, microprocessor-based or programmable consumer electronics, game console, set-top box, or another device that a user utilizes to communicate over a network. In various examples, a computing device includes a display module (not shown) to display information (e.g., in the form of specially configured user interfaces). In some embodiments, computing devices may comprise one or more of a touch screen, camera, keyboard, microphone, or Global Positioning System (GPS) device.

Client device 104 may be used by a user to access the resources of the enterprise. For example, client device 104 may be used to access files for a project the user is working on. Client device 104 may also be used to review their access rights and respond to requests to grant access to resources (discussed in more detail below).

Client device 104 and access rights application server 102 (and other access right management servers) may communicate via a network (not shown). The network may include local-area networks (LAN), wide-area networks (WAN), wireless networks (e.g., 802.11 or cellular network), the Public Switched Telephone Network (PSTN) Network, ad hoc networks, cellular, personal area networks or peer-to-peer (e.g., Bluetooth®, Wi-Fi Direct), or other combinations or permutations of network protocols and network types. The network may include a single Local Area Network (LAN) or Wide-Area Network (WAN), or combinations of LAN's or WAN's, such as the Internet.

Access rights may be authorized in several ways. As discussed above, the one method may be for a user to manually request access. For example, the user may receive a request denied message on a resource, and then the user may email their supervisor (or the user in charge of the resource) to obtain access. In some instances, a user may request access via a website (e.g., right-click on a resource and request access). Some resource types may have dedicated web applications where a user may request access, such as a building access web application.

Access rights application server 102 may use a different mechanism for authorizing resources. For example, access modification component 126 may automatically initiate requests to the relevant users or systems. In some examples, the communication from access modification component 126 may occur using an application programming interface (API) such as API 114. An API provides a method for computing processes to exchange data. A web-based API (e.g., API 114) may permit communications between two or more computing devices such as a client and a server. The API may define a set of HTTP calls according to Representational State Transfer (RESTful) practices. For example, A RESTful API may define various GET, PUT, POST, DELETE methods to create, replace, update, and delete access right data stored in a database (e.g., data store 116).

Accordingly, access modification component 126 may generate a change access right electronic message application programming interface (API) call. The API call may include parameters of an identification of the resource; a user identifier; and a request to authorize (or revoke access to) the user identifier to access the resource. The API call may be transmitted to the server associated with managing the resource (e.g., access rights application server 102).

Trigger event detector 124 may monitor changes in a user profile that may be used to initiate changes in access rights. Trigger events may be, but are not limited to, a user being added/removed to a project, a user being added/removed from a distribution list, a user being terminated from their position, a change in role, a change in department, a change in a location of a calendar invite, etc.

Trigger event detector 124 may be implemented in several manners, such as by using webhooks, periodic requests for new data, daily updates, etc. Webhooks are a way for web applications or systems to communicate with each other in real-time. For example, in the context of adding a user to an email distribution list, a webhook may be set up to notify an application, such as trigger event detector 124, whenever this action occurs.

The process may begin with the user being added to the email distribution list, either manually or through an automated process. Then, the email distribution service sends a request to a webhook URL, which has been pre-configured by trigger event detector 124. The payload (e.g., a JavaScript Object Notation (JSON) message) of the webhook received may include information about the event that occurred—in this case, the user being added to the email distribution list, the user identifier, and an email distribution list identifier. Similar webhooks may be used by trigger event detector 124 for other events such as a user being removed from a distribution list, changing roles, etc.

Once the event is detected, trigger event detector 124 may transmit a message to access modification component 126 to modify an access right for the affected user. The access right may be determined based on an output of machine learning model 122. Machine learning model 122 is discussed further in the context of FIG. 2.

Access rights application server 102 may include web server 108 to enable data exchanges with client device 104 via web client 106. Although generally discussed in the context of delivering webpages via the Hypertext Transfer Protocol (HTTP), other network protocols may be utilized by web server 108 (e.g., File Transfer Protocol, Telnet, Secure Shell, etc.). A user may enter in a uniform resource identifier (URI) into web client 106 (e.g., the INTERNET EXPLORER® web browser by Microsoft Corporation or SAFARI® web browser by Apple Inc.) that corresponds to the logical location (e.g., an Internet Protocol address) of web server 108. In response, web server 108 may transmit a web page that is rendered on a display device of a client device (e.g., a mobile phone, desktop computer, etc.).

Additionally, web server 108 may enable a user to interact with one or more web applications provided in a transmitted web page. A web application may provide user interface (UI) components that are rendered on a display device of client device 104. The user may interact (e.g., select, move, enter text into) with the UI components, and based on the interaction, the web application may update one or more portions of the web page. A web application may be executed in whole, or in part, locally on client device 104. The web application may populate the UI components with data from external sources or internal sources (e.g., data store 116) in various examples. For example, a web application may be a file rights web application or a physical access rights web application.

The web application may be executed according to application logic 110. Application logic 110 may use the various elements of access rights application server 102 to implement the web application. For example, application logic 110 may issue API calls to retrieve or store data from data store 116 and transmit it for display on client device 104. Similarly, data entered by a user into a UI component may be transmitted using API 114 back to the web server. Application logic 110 may use other elements (e.g., vector encoder 120, machine learning model 122, trigger event detector 124, etc.) of access rights application server 102 to perform functionality associated with access rights application server 102, such as described above.

Data store 116 may store data that is used by access rights application server 102. For examples, data store 116 may store user accounts 118, machine learning model 122, and resource groupings for clusters of similar users (discussed in more detail with respect to FIG. 3). Data store 116 is depicted as singular element but may in actuality be multiple data stores. The specific storage layout and model used in by data store 116 may take a number of forms—indeed, a data store 116 may utilize multiple models. Data store 116 may be, but is not limited to, a relational database (e.g., SQL), non-relational database (NoSQL) a flat file database, object model, document details model, graph database, shared ledger (e.g., blockchain), or a file system hierarchy. Data store 116 may store data on one or more storage devices (e.g., a hard disk, random access memory (RAM), etc.). The storage devices may be in standalone arrays, part of one or more servers, and may be located in one or more geographic areas.

Figure 2:
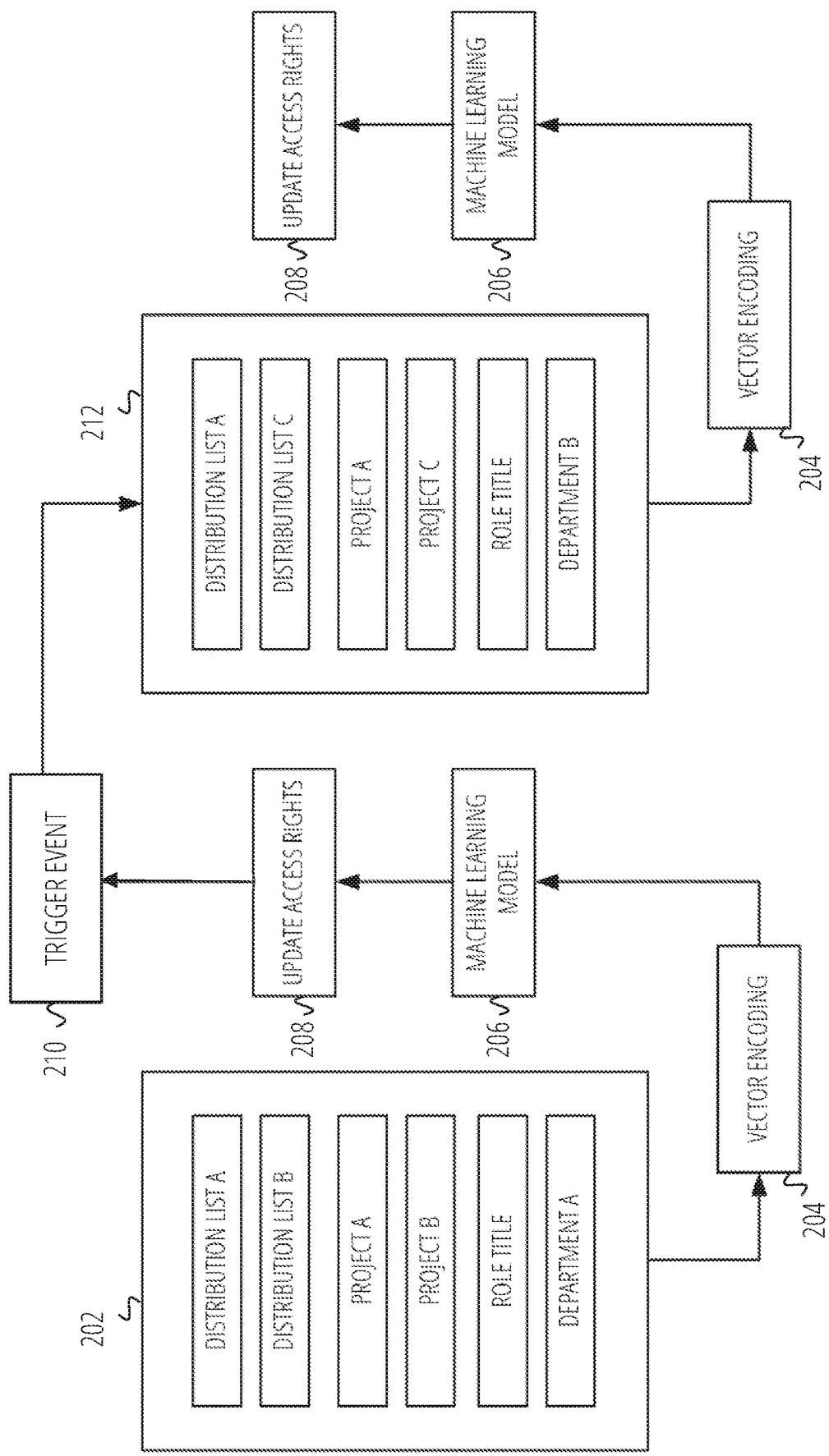
FIG. 2 is a visual representation of updating access rights, according to various examples.

FIG. 2 is a visual representation of updating access rights, according to various examples. The visual representation includes user digital characteristics 202, vector encoding 204, machine learning model 206, update access rights operation 208, trigger event 210, and user digital characteristics 212.

User digital characteristics 202 may represent the various elements used to match the user to other similar users. For example, user digital characteristics 202 may identify the distribution lists the member is part of, the projects, a title of the role within a project (or within an enterprise), and what department they are part of. In some examples, not all of the digital characteristics illustrated are available or knowable at all times. For example, users may join and leave projects but do so without updating an electronic database. Additionally, other digital characteristics (not illustrated) may be used such as the identity of resources used, the duration of access for a resource, and frequency of access of a resource. In the instance of user digital characteristics 202, the user is part of two distribution lists, two projects, has a role title, and is part of department A.

Vector encoding 204 represents the operation of converting the digital characteristics of user digital characteristics 202 into a format for inputting into machine learning model 206. For example, many machine learning model only accept numerical data. Accordingly, an email distribution such as "support@acme.com" would not be an acceptable input to a neural network. One technique for converting an email distribution list (or other resource) is using one-hot encoding in which each distribution list is assigned an element position of a vector that is the length of the total number of distribution lists—e.g., <distribution list A, distribution list B, distribution list C . . . distribution list N>. Thus, a vector input for an email distribution element may be <1, 1, 0 . . . 0> for user digital characteristics 202 and <1, 0, 1 . . . 0> for user digital characteristics 212.

Another technique is to use word embeddings. Word embeddings are dense vectors that represent words in a high-dimensional space. These embeddings may be learned in a training process using a training corpus set (e.g., resource names, role names, product descriptions, etc., of an enterprise) or existing word embeddings sets may be used. The word embeddings capture the semantic relationships between words. For example, the term "King" and "Queen" may be close in vector space—Euclidian distance or cosign similarity—relative to terms "King" and "Tree."

The machine learning model may have a standardized input format such that a set of digital characteristics may be consistently and repeatedly used. For example, the format may be <<email distribution list vector>, <role title vector>, <file access vector>, <project vector>, <department vector>>. The file access vector may include multiple components such as a file identifier, length of access, and frequency of access (e.g., daily, weekly, monthly in a one-hot encoding technique).

The output of machine learning model 206 may depend on the type of machine learning model used and its associated hyperparameters (e.g., configuration). For example, if a neural network is used, the output may be an output vector—the length of which corresponds to a chosen number of similarity clusters. Accordingly, if the machine learning model used labeled training data that grouped users into 1000 groups, the output would be a 1000 vector output. Each element of the output vector may be a probability score (e.g., 0-1) that the inputted vectorized digital characteristics match other users in the group corresponding the vector location. For example, the output vector may be <0.95, 0.01, 0.5 . . . >. Thus, the user may be a 95% match to the group associated with the first location in the vector, but only a 1% match to the second.

Machine learning model 206 may be an unsupervised learning model such as k-means clustering. A data point in k-means clustering may be an n-dimensional vector that includes the features used in the ultimate comparison. For example, the vector may be one such as created from vector encoding 204. Next, a number of clusters (k) may be chosen (e.g., 1000). One way to select 'k' is by using the elbow method, which involves plotting the within-cluster sum of squares (WCSS) against the number of clusters and selecting the number of clusters at the elbow point. The k-means clustering algorithm starts by randomly selecting 'k' initial cluster centroids. Then, it iteratively assigns each data point to the nearest centroid and updates the centroids based on the mean of the data points in the cluster until convergence.

After a cluster identifier has been determined by the output of machine learning model 206, update access rights operation 208 may be performed. For example, the cluster identifier may be associated with a set of access rights of various resources. A visual representation of this operation is discussed more in detail with respect FIG. 3 Accordingly, a comparison may be made between access rights of the user (e.g., the user with user digital characteristics 202) and the access rights of the cluster identifier.

If a resource is authorized for the cluster identifier, access modification component 126 may automatically request that access be given to the user. Conversely, if a resource is not authorized in the cluster identifier, access modification component 126 may automatically transmit a request to have the user's access revoked. As discussed above, access modification component 126 may directly format an API call to have the access changed or transmit an email to another user (e.g., a supervisor or resource manager) to approve the request. In various examples, a bulk request may be made to clone the access rights of the cluster identifier to the user instead of iterating through to obtain the differences.

After update access rights operation 208 has been completed, trigger event 210 may occur which changes the user's digital characteristics. As seen, user digital characteristics 212 differ from user digital characteristics 202 in that Distribution List B has been switched to Distribution List C; Project B for has been dropped for Project C; and the user is no longer associated with Department A, but is now in Department B. Any of these changes may have resulted in a webhook call to trigger event detector 124. In response, a new vector may be generated based on user digital characteristics 212 and inputted into machine learning model 206.

The result of the output may be a new cluster identifier for the user. Update access rights operations 208 may retrieve the set of access rights for resources associated with the new cluster identifier. Then, one or more requests may be transmitted by access modification component 126 to update the access rights for resources.

Data store 116 may store logic rules for when a user should automatically be given access to a resource as compared to an automated email message. For example, a resource may have a Bool value that indicates if it may be automatically authorized. Another rule may be that certain role title or departments may dictate if authorization may be automatically granted. Another rule may indicate that revoking access rights is performed via an API, but adding authorization is completed using an e-mail request.

In various examples, multiple machine learning models may be used in combination with each other. For example, there may be a machine learning model trained using project data as the input data without regard to additional information such as distribution lists, etc. Another machine learning model may be used for location resources. In this manner, the type of trigger event may dictate which machine learning model is run. For example, if a meeting invite changes location, the location machine learning model may be executed.

In various examples, the machine learning models may work together. For example, a k-means clustering algorithm may be used to identify the clusters. Then, training data may be compiled based on user characteristics within the clusters. Accordingly, the training data may include thousands of labeled pairs of <user digital characteristics, cluster identifier> pairs.

Figure 3:
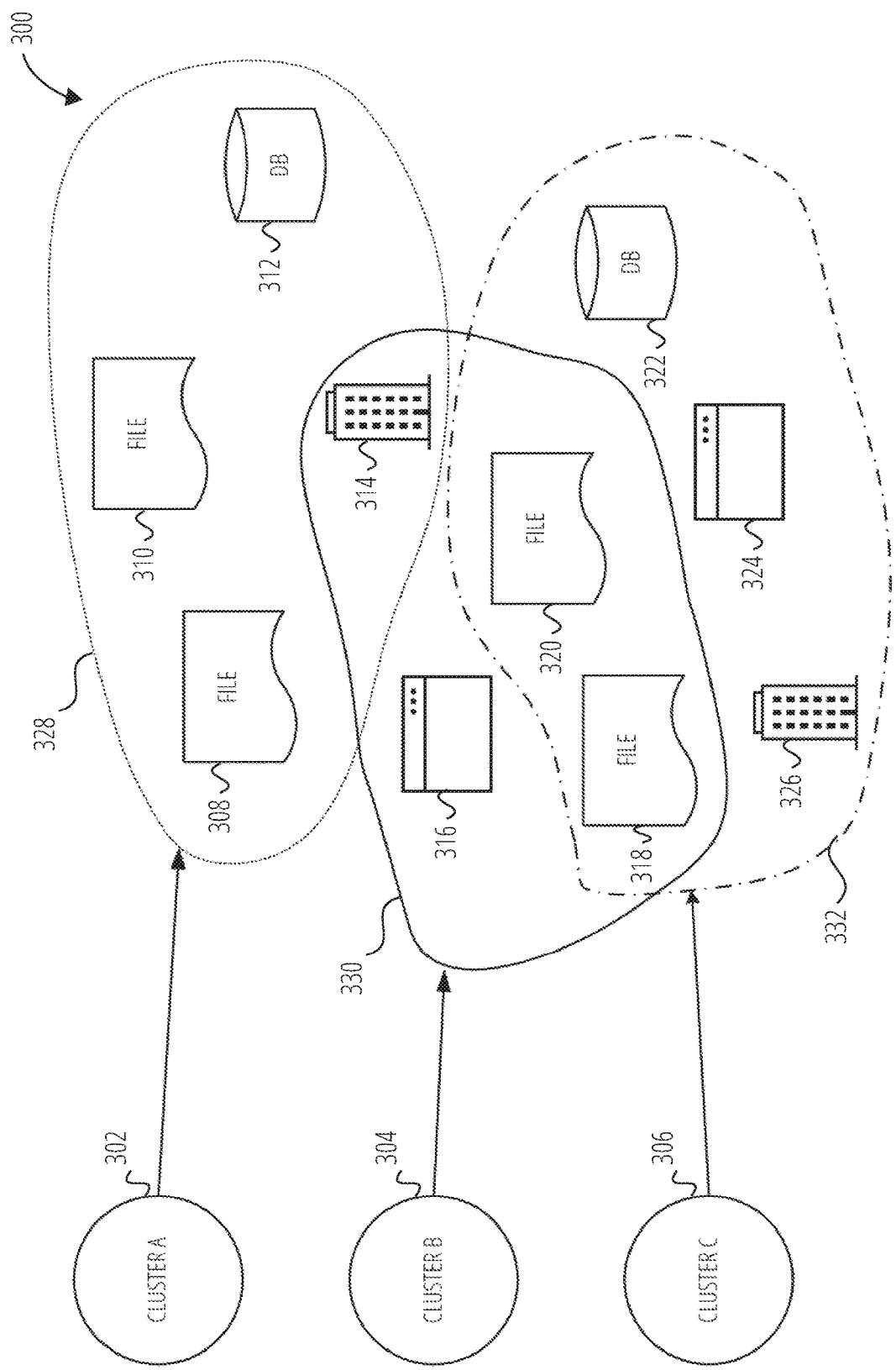
FIG. 3 is a visual depiction of relationships between clusters and groups of resources, according to various examples.

FIG. 3 is a visual depiction of relationships between clusters and groups of access rights, according to various examples. FIG. 3 includes diagram 300 of a cluster 302, a cluster 304, a cluster 306, a file 308, a file 310, a database 312, a building 314, a file 316, a file 318, a file 320, a database 322, a web application 324, a building 326, an authorized resource group 328, an authorized resource group 330, and an authorized resource group 332.

The relationships and groups in diagram 300 may be based on accessing data structures stored in data store 116. In other examples, they may be generated in real-time after a trigger event. For discussion purposes, it is assumed the clusters and authorized resource groups are generated and stored as the result of execution of a k-means clustering machine learning model. As shown, the resources within a group are not mutually exclusive. For example, building 314 is in both authorized resource group 328 and authorized resource group 330. Application logic 110 may store logic rules on how the authorized resource groups are determined. As detailed below, there are several manners in which the groups may be generated.

For each cluster identifier, there may be a stored list of authorized resources based on the users that are part of the cluster. Additionally, each user in a cluster identifier may have their own set of authorized resources. The list of authorized resources may be the overlapping authorized resources for each individual user. Thus, each user in cluster 302 may have—distinct from being in the cluster—have access to each resource in authorized resource group 328. In this manner, if a new user matches to cluster 302, they will not be given access to resources that only a subset of users in cluster 302 have access to.

In another example, the list of authorized resources is determined based on the average frequency of access, average duration of access, or the percentage of users that have access to an individual resource. This type of list may be configured to be smaller or larger than the overlapping list discussed above. For example—even if a resource is not authorized for every user in cluster 302—if a certain percentage of users (e.g., 95%) are authorized to use the resource it may be part of authorized resource group 328. Or—even if all users are authorized to access a resource—but on average the resource is access less than once per week, it may not be part of authorized resource group 328.

The list of authorized resources may also be modified based on responses to requests for access to a resource. For example, consider that a user has originally been identified as part of cluster 302. Then, the user may move off of certain projects, be added to others, and move physical locations. In response, machine learning model 122 may identify that the user is now part of cluster 306. Accordingly, access modification component 126 may access the list of authorized resources for authorized resource group 332. As illustrated, there is no overlap between authorized resource group 328 and authorized resource group 332.

In various examples, access modification component 126 may automatically transmit API messages to the respect servers associated with file 308, file 310, database 312, and building 314 requesting the user's access be terminated. Access modification component 126 may then transmit an e-mail request to the user's manager requesting authorization to file 318, file 320, database 322, web application 324, and building 326. The manger may authorize the change with respect to file 318, database 322, web application 324, and building 326, but deny the change with respect to file 320. In response, authorized resource group 332 may be changed to removed file 320.

Figure 4:
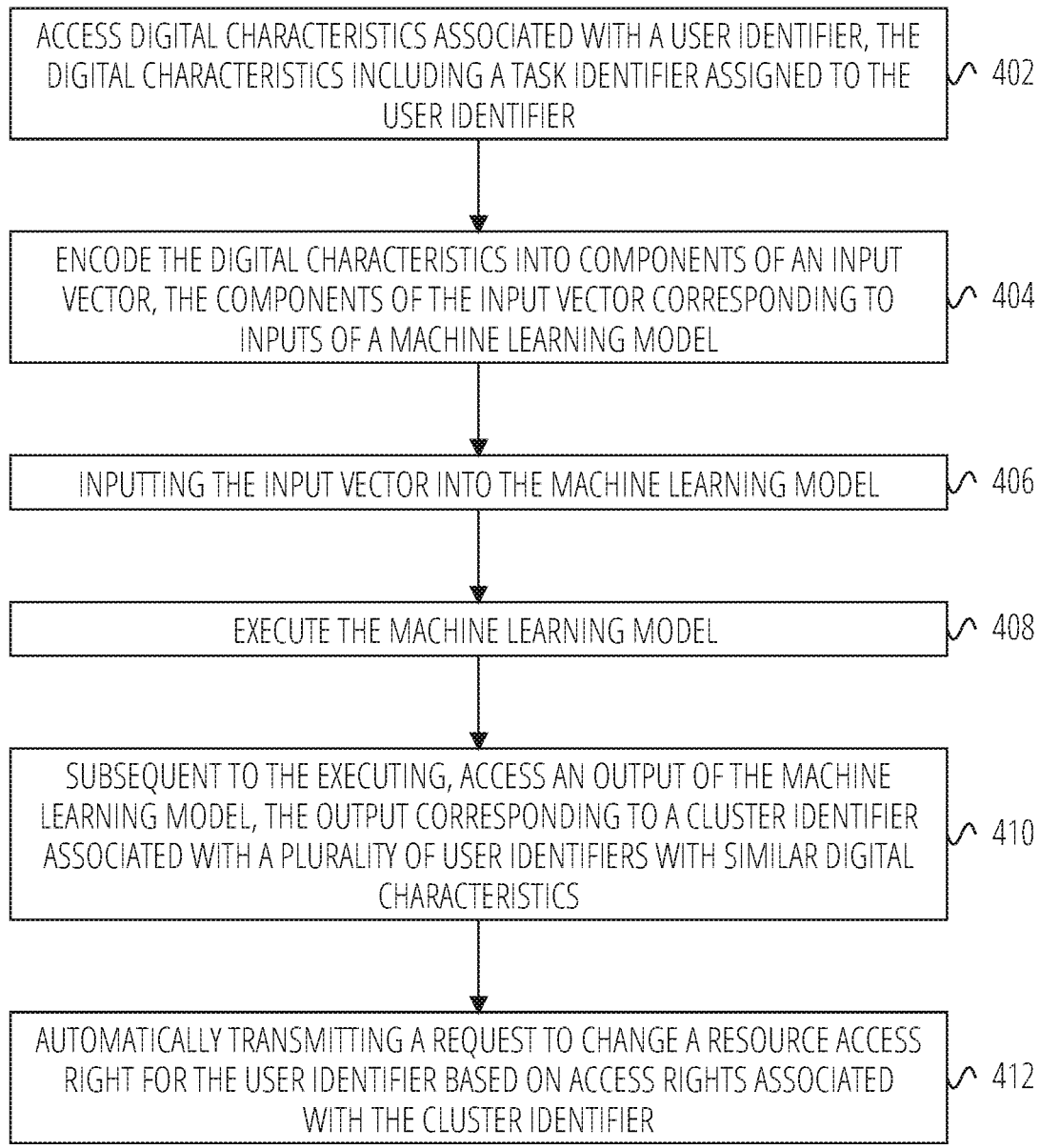
FIG. 4 is a flowchart of operations of a method to update access rights associated with a user identifier, according to various examples.

FIG. 4 is a flowchart of operations of a method to update access rights associated with a user identifier, according to various examples. The method is represented as a set of blocks that describe operations 402 to 412. The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 4. The one or more processors may instruct other component of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure.

In operation 402, the method includes accessing digital characteristics associated with a user identifier, the digital characteristics including a task identifier assigned to the user identifier. The task identifier may represent a project that the user associated with user identifier is currently working on. The digital characteristics may also include other characteristics such as described above.

In operation 404, the method includes encoding the digital characteristics into components of an input vector where the components of the input vector corresponding to inputs of a machine learning model. Encoding may be performed such as described with respect to vector encoder 120 and vector encoding 204.

In operation 406, the method includes inputting the input vector into the machine learning model. In operation 408, the method includes executing the machine learning model. Inputting may, for example, including transmitting an API call to a server with the input vector. Executing may include running a script or executable binary file on a server such as access rights application server 102. The executing may be performed automatically in response to receiving the input vector.

In operation 410, the method includes, subsequent to the executing, accessing an output of the machine learning model. The output may correspond to a cluster identifier associated with a plurality of user identifiers with similar digital characteristics. For example, in a neural network, a position of an output vector may be used to lookup a corresponding cluster identifier. Or if the machine learning model is a k-means clustering algorithm, the output may be the cluster identifier itself.

In operation 412, the method includes automatically transmitting a request to change a resource access right for the user identifier based on access rights associated with the cluster identifier. The method may also include prior to the automatically transmitting, determining a difference between current access rights of the user identifier and the access rights associated with the cluster identifier, the difference indicating the user identifier is not authorized to access to a resource that is authorized with respect to the cluster identifier, and where the request to change the resource access right includes a request to authorize access to the resource for the user identifier.

The method may also include where automatically transmitting the request to change the resource access right for the user identifier based on access rights associated with the cluster identifier includes generating a change access right electronic message that includes an identification of the resource, the user identifier, and a link to approve the request. The electronic message may be transmitted to a user identifier authorized to approve the request. The user identifier authorized to approve the request may be stored in user profile or data store.

The method may also include where automatically transmitting the request to change the resource access right for the user identifier based on access rights associated with the cluster identifier includes generating a change access right electronic message application programming interface (API) call, the API call including parameters of an identification of the resource, the user identifier, and a request to authorize the user identifier to access the resource. The API may then be transmitted.

The method may also include further includes receiving an indication of an update access rights trigger event. In response to receiving the indication, the method may include accessing second digital characteristics associated with the user identifier, encoding the second digital characteristics into components of a second input vector, inputting the second input vector into the machine learning model, and executing the machine learning model. Subsequent to the executing, the method may include accessing a second output of the machine learning model that corresponds to a second cluster identifier associated with a plurality of user identifiers with similar digital characteristics. The method may further include automatically transmitting a second request to change a second resource access right for the user identifier based on access rights associated with the second cluster identifier.

The method may also include where the update access rights trigger event is the user identifier being added to an email distribution list.

The method may also include where the digital characteristics include a role of the user identifier, and where the update access rights trigger event is a change in role.

The method may also include where the update access rights trigger event is a change in location of a meeting in an event associated with the user identifier.

The method may also include where automatically transmitting the second request to change the second resource access right for the user identifier based on access rights associated with the second cluster identifier includes transmitting a request for physical access to a building. Other technical features may be readily apparent to one skilled in the art from the following figures, descriptions, and claims.

Figure 5:
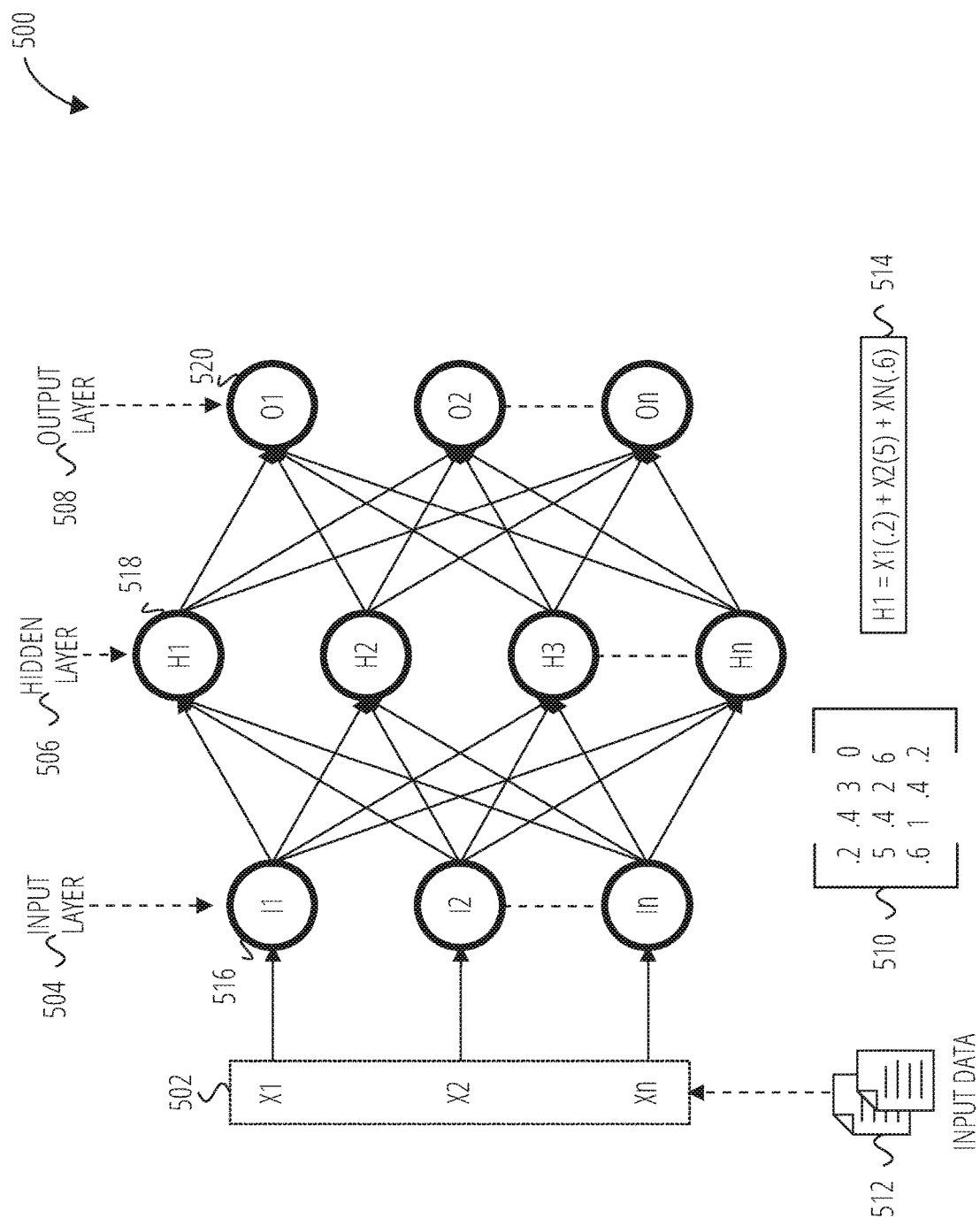
FIG. 5 illustrates an artificial neural network architecture, according to various examples.

FIG. 5 illustrates an artificial neural network 500 architecture according to various examples. Artificial intelligence (AI), machine learning (ML) algorithms, and neural networks are often used interchangeably, but they are better described as a set of nested concepts. Artificial intelligence may be considered the broadest concept and may be thought of as any program that attempts to perform a task/solve a problem that a human might such as facial recognition, classification, conversation, etc.

A subset of AI is ML. Machine learning encompasses different algorithms that are used to predict or classify a set of data used. In general terms, there are three types of ML algorithms: supervised learning, unsupervised learning, and reinforcement learning—sometimes a fourth, semi-supervised learning is also used.

Supervised learning algorithms may make a prediction based on a labeled data set (e.g., text with a rating of whether it is spam) and are generally used for classification, regression, or forecasting. Some examples of supervised learning algorithms are Naïve Bayes, Support Vector Machines, Linear Regression, Logistic Regression, Decision Trees, Random Forests, and K-Nearest Neighbor. Unsupervised learning algorithms may use an unlabeled data set (e.g., looking for clusters of similar data based on common characteristics). An example of an unsupervised learning algorithm is K-mean clustering. As discussed above, k-means clustering may be used to find clusters of users with similar digital characteristics.

Reinforcement learning algorithms generally make a prediction/decision, and then a user determines whether the prediction/decision was right—after which the machine learning model may be updated. This type of learning may be useful when a limited input data set is available.

Neural networks (also referred to an artificial Neural networks (ANN)) are a subset of ML algorithms that may be used to solve similar problems to those machine learning algorithms listed above. ANNs are computational structures that are loosely modeled on biological neurons. Generally, ANNs encode information (e.g., data or decision making) via weighted connections (e.g., synapses) between nodes (e.g., neurons). ANNs have many AI applications, such as automated perception (e.g., computer vision, speech recognition, contextual awareness, etc.), automated cognition (e.g., decision-making, logistics, routing, supply chain optimization, etc.), automated control (e.g., autonomous cars, drones, robots, etc.), among others.

Many ANNs are represented as matrices of weights that correspond to the modeled connections. Multiple matrices may be used when there are multiple layers. ANNs operate by accepting data into an input layer of neurons that often have many outgoing connections to neurons in another layer of neurons. One type of layer, a dense layer, is a layer in which each neuron in one layer is connected to each neuron in the next layer. If there are more than two layers, the layers between an input layer of neurons and an output layer of neurons are referred to as hidden layers. At each traversal between neurons, the corresponding weight modifies the input and may be tested against a threshold at the destination neuron. If the weighted value exceeds the threshold, the value is again weighted, or transformed through a nonlinear function, and transmitted to another neuron further down the ANN graph. If the threshold is not exceeded then, generally, the value is not transmitted to a down-graph neuron and the synaptic connection remains inactive. The process of weighting and testing continues until an output neuron is reached. The pattern and values of the output neurons constitutes the result of the ANN processing.

The correct (e.g., most accurate) operation of most ANNs relies on correct weights. However, ANN designers do not generally know which weights will work for a given application. Instead, a training process is used to arrive at appropriate weights. ANN designers typically choose a number of neuron layers or specific connections between layers including circular connection. A training process generally proceeds by selecting initial weights, which may be randomly selected.

Training data is fed into the ANN and results are compared to an objective function that provides an indication of error. The error indication is a measure of how wrong the ANN's result was compared to an expected result. This error is then used to correct the weights. Over many iterations, the weights will collectively converge to encode the operational data into the ANN. This process may be called an optimization of the objective function (e.g., a cost or loss function), whereby the cost or loss is minimized. The training data may be past labeled data sets in the same form as eventual input data. For example, the training data may be sets of user digital characteristics and cluster identifiers. The accuracy may be determined based comparing the actual output of the ANN to the correct output—e.g., the cluster identifier in the training data for a given set of digital characteristics.

A gradient descent technique is often used to perform the objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight will move towards the "correct," or operationally useful, value. In some implementations, the amount, or step size, of movement is fixed (e.g., the same from iteration to iteration). Small step sizes tend to take a long time to converge, whereas large step sizes may oscillate around the correct value or exhibit other undesirable behavior. Variable step sizes may be attempted to provide faster convergence without the downsides of large step sizes.

Backpropagation is a technique whereby training data is fed forward through the ANN—here "forward" means that the data starts at the input neurons and follows the directed graph of neuron connections until the output neurons are reached—and the objective function is applied backwards through the ANN to correct the synapse weights. At each step in the backpropagation process, the result of the previous step is used to correct a weight. Thus, the result of the output neuron correction is applied to a neuron that connects to the output neuron, and so forth until the input neurons are reached.

With reference back to FIG. 5, the artificial neural network 500 is an example of a shallow neural network—as it has a single hidden layer. Neural networks with more than one hidden layer are considered deep learning machine learning models. If artificial neural network 500 is being trained, input data 512 may be a subset of historical data. When artificial neural network 500 is deployed for use, input data 512 may be the data that is being classified, etc.

The artificial neural network 500 comprises input values 502, an input layer 504, a hidden layer 506, an output layer 508, a weight matrix 510, input data 512, a neuron calculation 514, an input neuron 516, a hidden neuron 518, and an output neuron 520. As discussed in more detail with respect to FIG. 2, the input data for artificial neural network 500 may labeled data sets of user digital characteristics.

However, as a conceptual walkthrough example of how a neural network functions, consider that artificial neural network 500 is used for determining a type of animal based on observable features of the animal such as height, weight, and color. Ultimately, the input to a neural network is in a numerical structure, a tensor. A tensor may have any number of dimensions. A zero-dimensional tensor is referred to as a scalar, a one-dimensional tensor is a vector, a two-dimensional tensor may be a matrix, and anything beyond three dimensions may just referred to as a tensor. The shape of a tensor may indicate the number of elements in each dimension.

In the example of animal classification, a vector may be used with three elements—one each for height, weight, and color. In FIG. 5, input values 502 may correspond to the height, weight, and color of an animal. Color, however, is not a numerical value and thus a conversion from a color to a number is used (e.g., brown is a one, red is a two, etc.). As an example, consider that a vector of [16, 7, 1] is an input vector for artificial neural network 500. Accordingly, input neuron 516 may be passed a value of 16. The input vector may in actuality be one output by vector encoding 204.

As indicated above, the connections between layers of neurons are represented as matrices. Weight matrix 510 is an example of weights between input layer 504 and hidden layer 506. Neuron calculation 514 identifies how the value of hidden neuron 518 may be calculated using weight matrix 510 with matrix multiplication. Using the example input vector above, the value of H1 may be [3.2+35+0.6]=38.8. The calculations for each of the other neurons in hidden layer 506 may be calculated in a similar way. The process of calculating values of output neuron 520 and the other output neurons may be made using another weight matrix (not shown).

Activation functions may be used as part of the value calculations of the hidden layer and output layer neurons. Different activation functions may be used depending on the problem that is trying to be solved. For example, for a binary classifier or multi-label classification a sigmoid activation may be used for the output layer. If the desired output is a multi-class classification than a SoftMax activation function may be used on the output layer. Other types of activation functions include, but are not limited to, Tanh, ReLu, Leaky ReLu, Binary step, Identity, and Swish.

Continuing the animal example, the number of output neurons in output layer 508 corresponds to the labeled number of animals—and because the animals are mutually exclusive—this is a multi-class classification style network. In FIG. 5, there are three output neurons indicating that this ANN outputs the probability with respect with three animal types, but an ANN may have thousands or tens of thousands or output neurons (in the case of cluster classification, the number may match the number of clusters). The value of each output neuron may indicate the probability of a classification of an animal type. For example, the value of output neuron 520 may be 0.99 indicating a 99% chance that the input vector corresponds to the animal corresponding to output neuron 520.

Figure 6:
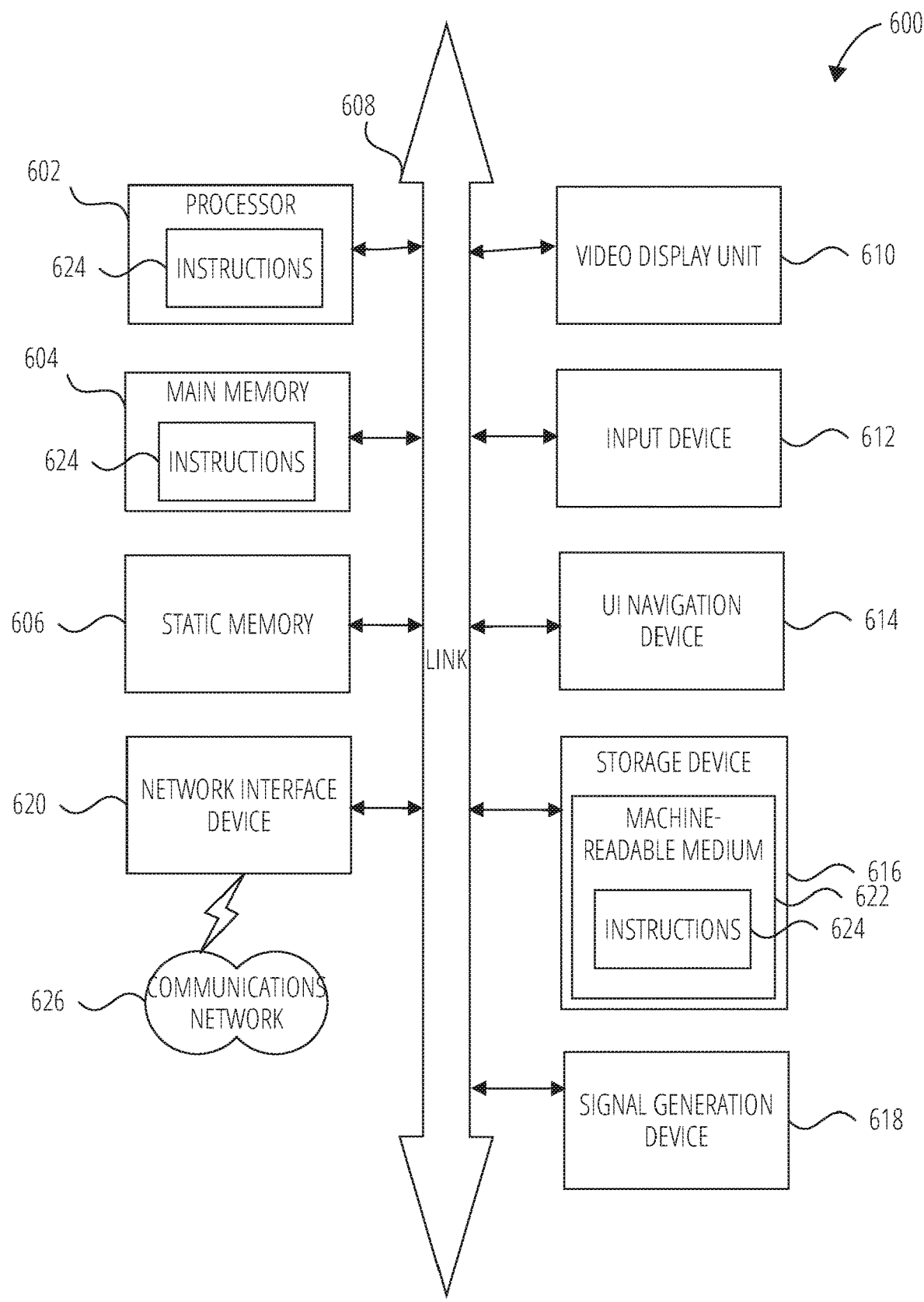
FIG. 6 is a block diagram illustrating a machine in the example form of a computer system, within which a set or sequence of instructions may be executed to cause the machine to perform any one of the methodologies discussed herein, according to various examples.

FIG. 6 is a block diagram illustrating a machine in the example form of computer system 600, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client Network environments, or it may act as a peer machine in peer-to-peer (or distributed) Network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 600 includes at least one processor 602 (e.g., a central processing unit (CPU), a graphics processing unit (GPU) or both, processor cores, compute nodes, etc.), a main memory 604 and a static memory 606, which communicate with each other via a link 608. The computer system 600 may further include a video display unit 610, an input device 612 (e.g., a keyboard), and a UI navigation device 614 (e.g., a mouse). In one embodiment, the video display unit 610, input device 612, and UI navigation device 614 are incorporated into a single device housing such as a touch screen display. The computer system 600 may additionally include a storage device 616 (e.g., a drive unit), a signal generation device 618 (e.g., a speaker), a network interface device 620, and one or more sensors (not shown), such as a global positioning system (GPS) sensor, compass, accelerometer, or other sensors.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" may include a single medium or multiple media (e.g., a centralized or distributed Database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. A computer-readable storage device may be a machine-readable medium 622 that excluded transitory signals.

The instructions 624 may further be transmitted or received over a communications network 626 using a transmission medium via the network interface device 620 utilizing any one of a number of well-known transfer protocols (e.g., HTTP). Examples of communication networks include a local area Network (LAN), a wide area Network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A method comprising:
   accessing digital characteristics associated with a user identifier, the digital characteristics including a task identifier assigned to the user identifier;

encoding the digital characteristics into components of an input vector, the components of the input vector corresponding to inputs of a machine learning model;
inputting the input vector into the machine learning model;
executing the machine learning model;
subsequent to the executing, accessing an output of the machine learning model, the output corresponding to a cluster identifier associated with a plurality of user identifiers with similar digital characteristics;
determining a difference between current access rights of the user identifier and the access rights associated with the cluster identifier, the difference indicating the user identifier is not authorized to access to a resource that is authorized with respect to the cluster identifier; and
automatically transmitting a request to change a resource access right for the user identifier based on access rights associated with the cluster identifier, wherein automatically transmitting includes:
generating a change access right electronic message that includes:
an identification of the resource;
the user identifier; and
a link to approve the request;
transmitting the change access right electronic message to a user authorized to approve the request;
generating a change access right electronic message application programming interface (API) call, the API call including parameters of:
the identification of the resource;
the user identifier; and
a request to authorize the user identifier to access the resource; and
transmitting the API call.

2. The method of claim 1, further comprising:
receiving an indication of an update access rights trigger event;
in response to receiving the indication, accessing second digital characteristics associated with the user identifier;
encoding the second digital characteristics into components of a second input vector,
inputting the second input vector into the machine learning model;
executing the machine learning model;
subsequent to the executing, accessing a second output of the machine learning model, the second output corresponding to a second cluster identifier associated with a plurality of user identifiers with similar digital characteristics; and
automatically transmitting a second request to change a second resource access right for the user identifier based on access rights associated with the second cluster identifier.

3. The method of claim 2, wherein the update access rights trigger event is the user identifier being added to an email distribution list.

4. The method of claim 2, wherein the digital characteristics include a role of the user identifier, and wherein the update access rights trigger event is a change in role.

5. The method of claim 2, wherein the update access rights trigger event is a change in location of a meeting in an event associated with the user identifier.

6. The method of claim 5, wherein automatically transmitting the second request to change the second resource access right for the user identifier based on access rights associated with the second cluster identifier includes transmitting a request for physical access to a building.

7. A non-transitory computer-readable medium comprising instructions, which when executed by a processing unit, configure the processing unit to perform operations comprising:
accessing digital characteristics associated with a user identifier, the digital characteristics including a task identifier assigned to the user identifier;
encoding the digital characteristics into components of an input vector, the components of the input vector corresponding to inputs of a machine learning model;
inputting the input vector into the machine learning model;
executing the machine learning model;
subsequent to the executing, accessing an output of the machine learning model, the output corresponding to a cluster identifier associated with a plurality of user identifiers with similar digital characteristics;
determining a difference between current access rights of the user identifier and the access rights associated with the cluster identifier, the difference indicating the user identifier is not authorized to access to a resource that is authorized with respect to the cluster identifier; and
automatically transmitting a request to change a resource access right for the user identifier based on access rights associated with the cluster identifier, wherein automatically transmitting includes:
generating a change access right electronic message that includes:
an identification of the resource;
the user identifier; and
a link to approve the request;
transmitting the change access right electronic message to a user authorized to approve the request;
generating a change access right electronic message application programming interface (API) call, the API call including parameters of:
the identification of the resource;
the user identifier; and
a request to authorize the user identifier to access the resource; and
transmitting the API call.

8. The non-transitory computer-readable medium of claim 7, wherein the instructions, which when executed by the processing unit, further configure the processing unit to perform operations comprising:
receiving an indication of an update access rights trigger event;
in response to receiving the indication, accessing second digital characteristics associated with the user identifier;
encoding the second digital characteristics into components of a second input vector,
inputting the second input vector into the machine learning model;
executing the machine learning model;
subsequent to the executing, accessing a second output of the machine learning model, the second output corresponding to a second cluster identifier associated with a plurality of user identifiers with similar digital characteristics; and
automatically transmitting a second request to change a second resource access right for the user identifier based on access rights associated with the second cluster identifier.

9. The non-transitory computer-readable medium of claim 8, wherein the update access rights trigger event is the user identifier being added to an email distribution list.

10. The non-transitory computer-readable medium of claim 8, wherein the digital characteristics include a role of the user identifier, and wherein the update access rights trigger event is a change in role.

11. The non-transitory computer-readable medium claim 8, wherein the update access rights trigger event is a change in location of a meeting in an event associated with the user identifier.

12. The non-transitory computer-readable medium of claim 11, wherein automatically transmitting the second request to change the second resource access right for the user identifier based on access rights associated with the second cluster identifier includes transmitting a request for physical access to a building.

13. A system comprising:
a hardware processing unit; and
a storage device comprising instructions, which when executed at the processing unit, configure the processing unit to perform operations comprising:
 accessing digital characteristics associated with a user identifier, the digital characteristics including a task identifier assigned to the user identifier;
 encoding the digital characteristics into components of an input vector, the components of the input vector corresponding to inputs of a machine learning model;
 inputting the input vector into the machine learning model;
 executing the machine learning model;
 subsequent to the executing, accessing an output of the machine learning model, the output corresponding to a cluster identifier associated with a plurality of user identifiers with similar digital characteristics;
 determining a difference between current access rights of the user identifier and the access rights associated with the cluster identifier, the difference indicating the user identifier is not authorized to access to a resource that is authorized with respect to the cluster identifier; and
 automatically transmitting a request to change a resource access right for the user identifier based on access rights associated with the cluster identifier, wherein automatically transmitting includes:
  generating a change access right electronic message that includes:
   an identification of the resource;
   the user identifier; and
   a link to approve the request;
  transmitting the change access right electronic message to a user authorized to approve the request;
  generating a change access right electronic message application programming interface (API) call, the API call including parameters of:
   the identification of the resource;
   the user identifier; and
   a request to authorize the user identifier to access the resource; and
  transmitting the API call.

14. The system of claim 13, wherein the instructions, which when executed by the processing unit, further configure the processing unit to perform operations comprising:
 receiving an indication of an update access rights trigger event;
 in response to receiving the indication, accessing second digital characteristics associated with the user identifier;
 encoding the second digital characteristics into components of a second input vector,
 inputting the second input vector into the machine learning model;
 executing the machine learning model;
 subsequent to the executing, accessing a second output of the machine learning model, the second output corresponding to a second cluster identifier associated with a plurality of user identifiers with similar digital characteristics; and
 automatically transmitting a second request to change a second resource access right for the user identifier based on access rights associated with the second cluster identifier.

15. The system of claim 14, wherein the update access rights trigger event is the user identifier being added to an email distribution list.

16. The system of claim 14, wherein the digital characteristics include a role of the user identifier, and wherein the update access rights trigger event is a change in role.

17. The system of claim 14, wherein the update access rights trigger event is a change in location of a meeting in an event associated with the user identifier.

18. The method of claim 17, wherein automatically transmitting the second request to change the second resource access right for the user identifier based on access rights associated with the second cluster identifier includes transmitting a request for physical access to a building.

* * * * *